United States Patent [19]
Straka

[11] 3,904,272
[45] Sept. 9, 1975

[54] MOSAIC LIGHT VALVE AND METHOD OF FABRICATING SAME
[75] Inventor: Emil R. Straka, Cupertino, Calif.
[73] Assignee: Varian Associates, Palo Alto, Calif.
[22] Filed: June 1, 1973
[21] Appl. No.: 365,914

[52] U.S. Cl. ............................. 350/150; 350/160
[51] Int. Cl.² ............................................. G02F 1/26
[58] Field of Search ...... 350/DIG. 2, 150, 151, 147, 350/160, 161; 340/146.3 MA, 146.3 SG

[56] References Cited
UNITED STATES PATENTS

| | | | |
|---|---|---|---|
| 3,531,181 | 9/1970 | Scarrott | 350/150 |
| 3,536,374 | 10/1970 | Smith-Vaniz | 350/150 |
| 3,560,955 | 2/1971 | Hallman | 350/150 |
| 3,602,904 | 8/1971 | Cummins | 350/150 |

Primary Examiner—Alfred E. Smith
Assistant Examiner—Michael J. Tokar
Attorney, Agent, or Firm—Stanley Z. Cole; D. R. Pressman; R. B. Nelson

[57] ABSTRACT

A mosaic of electro-optically active members, such as glass fibers, are assembled into a bundle and separated from each other by means of an optically opaque material which is either clad onto the respective active members or inserted as a separating structure in the assemblage. The assemblage of electro-optically active members is then heated and pressed together to fuse the assembly, which is sliced transversely into plates and polished. Optically transparent electrodes are deposited over opposite faces of each plate in registration with the respective ones of the active members making up the mosaic. An electrical potential which is applied across a respective active member changes an optical transmission property thereof, such as polarization or index of refraction, such that when the transmitted light is polarization analyzed or monitored, respectively, certain patterns in the light beam passing through the mosaic can be rendered relatively dark, in response to the application of a corresponding pattern of electrical potential.

8 Claims, 12 Drawing Figures

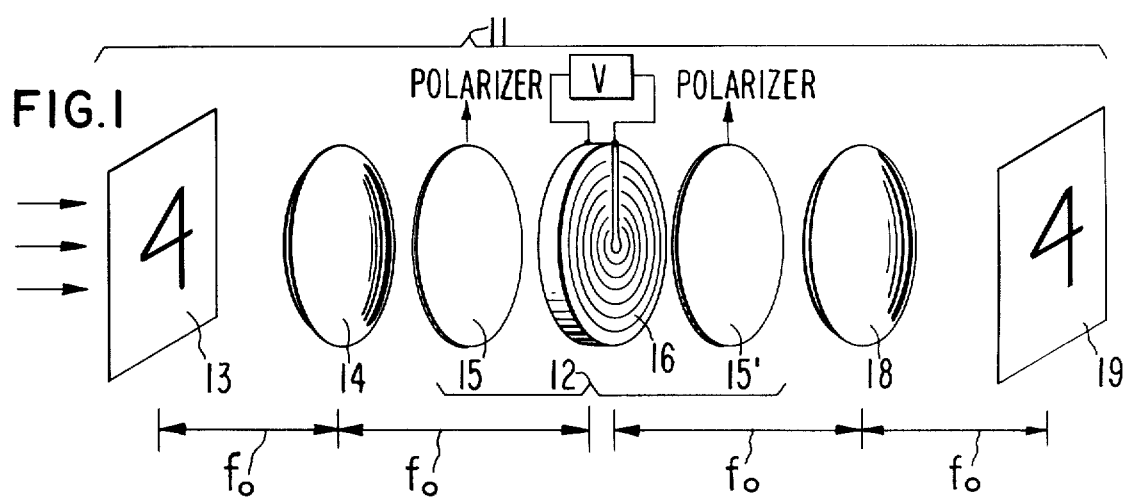
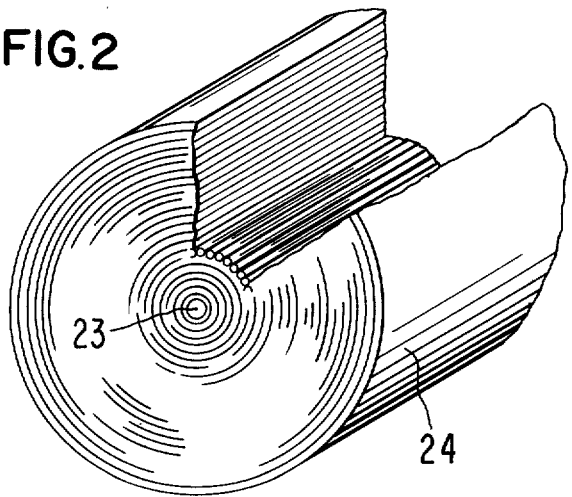
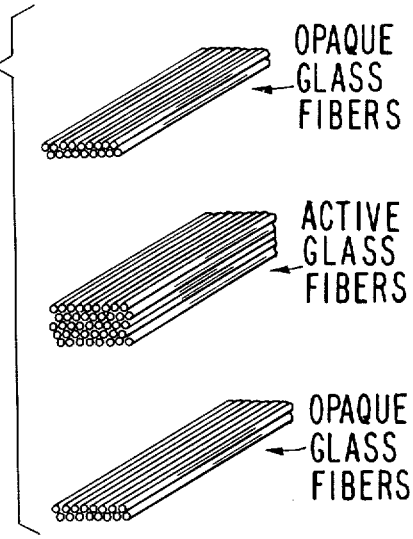
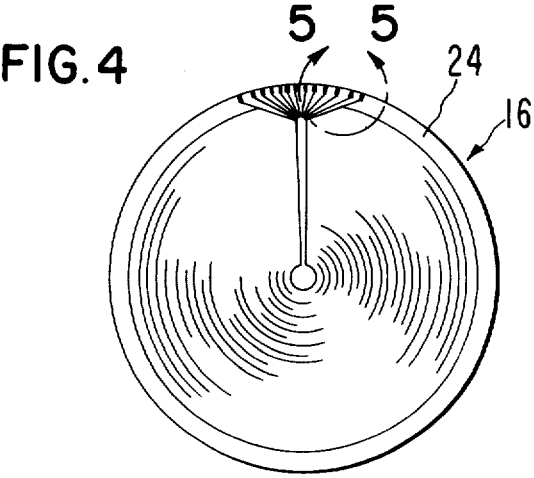
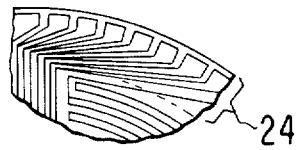

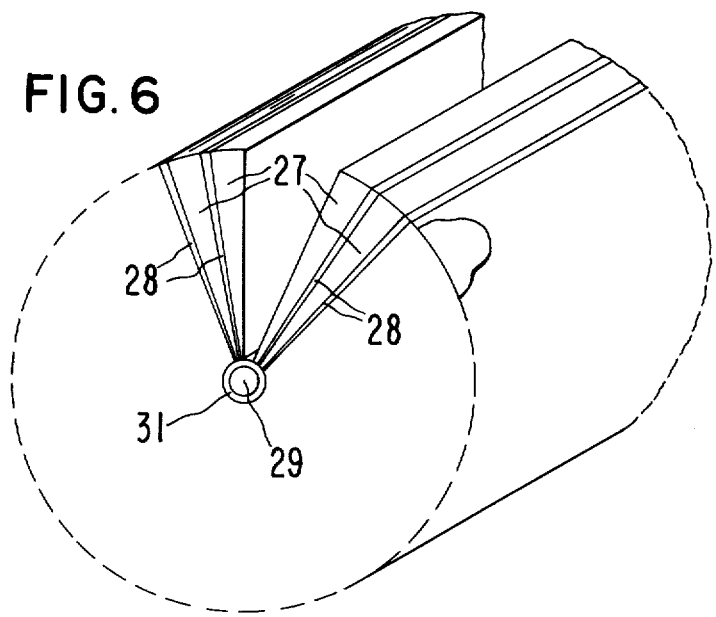
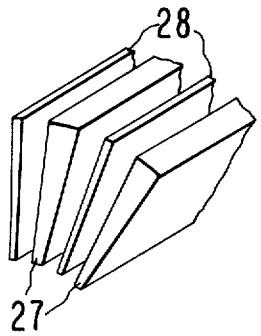
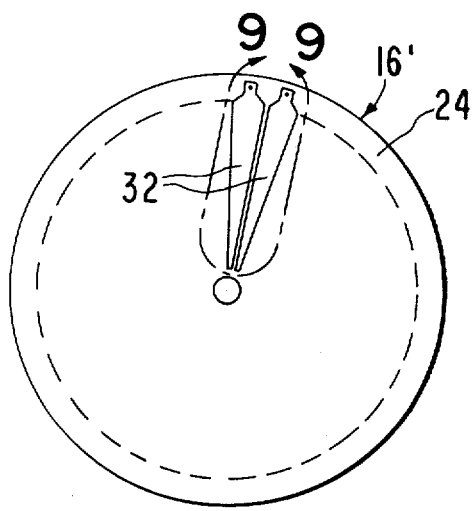
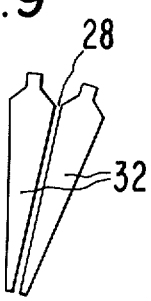
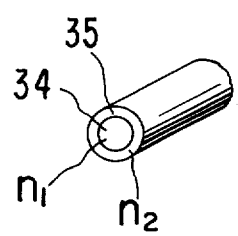
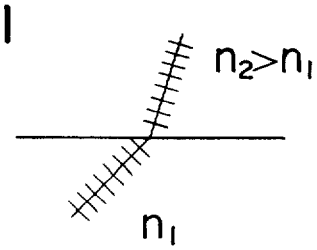
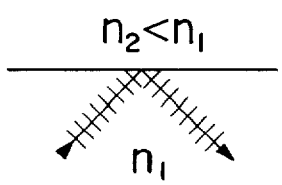

MOSAIC LIGHT VALVE AND METHOD OF FABRICATING SAME

BACKGROUND OF THE INVENTION

The present invention relates in general to light valves and more particularly to a mosaic type light valve employing electro-optically active glass-like members separated from each other by means of an optically opaque glass.

DESCRIPTION OF THE PRIOR ART

Heretofore, the contrast of photographs has been improved by taking a Fourier transform photograph of the print to be improved by placing the film at the focal point of a lens which views the print to be improved. The resultant photograph of the print corresponds to a Fourier transform plane image wherein the original image is converted into spatial Fourier transform components consisting of a multitude of concentric ring image components and a multitude of radially directed circumferentially spaced Fourier transform image components. In such a Fourier transform image, the dc spatial component, corresponding to the average brightness, is found at the center of the array of image components. This center dc component is then blotted out as by painting. The remaining Fourier transform image is then projected through a second lens onto a viewing screen. The lens is equidistant from the Fourier transform image and screen, such distance being the focal length of the lens. In this manner the viewing lens system serves to reconstitute the modified Fourier transform image into a reconstituted original image at the screen. This reconstituted image has certain low spatial frequency Fourier components eliminated therefrom, thereby providing a reconstituted image of increased contrast. Other Fourier components can be removed in a similar manner to modify the resultant image in various desired ways, such as to reduce pin point noise, etc.

The problem with this aforecited method for modifying original images is that considerable delay is encountered in processing of the film, blotting out certain portions thereof, and projecting the resultant image onto a viewing screen. It would be desirable to have an electronically controlled Fourier transform light valve that could serve to blot out or modify certain Fourier transform components of the Fourier transform image on a real time basis.

SUMMARY OF THE PRESENT INVENTION

The principal object of the present invention is the provision of an improved mosaic type light valve and method of fabricating same.

In one feature of the present invention, a mosaic of electro-optically active members is provided, each active member being separated from an adjacent active member by means of an optically opaque material. Optically transparent electrodes are formed overlaying opposite faces of the mosaic for selectively applying an electric field across respective ones of the mosaic elements for electrically controlling the optical transmission properties of light projected through the mosaic light valve.

In another feature of the present invention, the mosaic electro-optically active members are made of a material in which the plane of polarization of light transmitted therethrough is rotated in response to application of the electric field and wherein the incident light is polarized and the light after passing through the mosaic element is polarization analyzed, whereby the light transmitted through the composite assembly is controlled in response to the electric field.

In another feature of the present invention, the electro-optically active mosaic members are made of glass or glass like materials containing electrical polarization constituents selected from the group consisting of Tl, Pb, Bi, In, Sn, Sb, As, $NaKNbO_3$, $Pb_3Nb_2O_9$, $KTaO_3$, $BaTiO_3$ and PbO.

In another feature of the present invention the electro-optically active members are made of a glass selected from the group consisting of $GeS_2$ and $GeSe_2$.

In another feature of the present invention, the mosaic of electro-optically active members includes an array of radially spaced circumferentially directed concentric electro-optically active members for controlling certain annular type spatial Fourier transform components.

In another feature of the present invention, the mosaic of electro-optically active members include an array of circumferentially spaced radially directed electro-optically active members for independently controlling certain radial types of spatial Fourier optical components.

In another feature of the present invention, the electro-optically active members are made of a material in which the index of refraction changes in response to the applied electric field and the optically opaque separating material is a material having an index of refraction less than the index of refraction of the electro-optically active material when the electro-optically active member is optically transparent.

In another feature of the present invention, the mosaic of electro-optically active members is formed by assembling a bundle of electro-optically active members separated from each other by an optically opaque material, heating and pressing together the assemblage of members to produce a fused assemblage, slicing transversely through the assemblage to form mosaic plates, and polishing opposite faces of the mosaic plates.

In another feature of the present invention, optically transparent electrodes are deposited over opposite faces of the mosaic of electro-optic elements for selectively applying the electric potentials across the respective ones of the mosaic members.

Other features and advantages of the present invention will become apparent upon a perusal of the following specification taken in connection with the accompanying drawings wherein:

BRIEF DESCRIPTION OF THE DRAWINGS

FIG. 1 is a schematic perspective view of an optical system employing an electronically controlled Fourier transform mosaic light valve of the present invention, FIG. 2 is a perspective view, partly broken away, depicting a method for laying up glass fibers to form a mosaic light valve, FIG. 3 is an enlarged detail view showing the construction of the layers of the composite structure of FIG. 2, FIG. 4 is a plan view of a mosaic light valve incorporating features of the present invention, FIG. 5 is an enlarged detail view of a portion of the structure of FIG. 4 delineated by line 5—5, FIG. 6 is a view similar to that of FIG. 2 showing the laying up of electro-optically active members to form an alternative radial type Fourier transform mosaic light valve, FIG. 7 is an enlarged detail view showing the method for laying up the electro-optically active members of the assemblage of FIG. 6, FIG. 8 is a plan view similar to that of FIG. 4 depicting a radial array of Fourier transform electrodes, FIG. 9 is an enlarged detail view of a portion of the structure of FIG. 8 delineated by line 9—9, FIG. 10 is a perspective view of an electro-optically active member in an alternative type of mosaic light valve, FIG. 11 is a schematic line diagram depicting the refraction of optical wave energy at the boundary between the inner and outer members of FIG. 10, and FIG. 12 is a view similar to that of FIG. 11 depicting the reflection of wave energy at the boundary when the index of refraction of the outer layer is less than the index of refraction in the inner member for the structure of FIG. 10.

DESCRIPTION OF THE PREFERRED EMBODIMENTS

Referring now to FIG. 1, there is shown an optical system 11 employing a Fourier transform electro-optically active filter assembly 12 incorporating features of the present invention. More particularly, an image to be modified, as by having its contrast increased, is illuminated uniformly as by back lighting or front lighting thereof. The image 13 is placed a focal length of in front of a condensing lens 14 and the input face of a Fourier transform electro-optically active filter 16 (as more fully described hereinafter) is placed at the Fourier transform plane which is equal to the focal distance $f_0$ in back of the condensing lens 14.

The electric Fourier transform filter assembly 12 includes input and output plane polarizers 15 and 15', respectively. The input polarizer 15 serves to polarize the light image falling upon the face of the mosaic electro-optic filter element 16. Electro-optic filter element 16 includes a mosaic of active electro-optical elements, such as concentric, radially spaced arcuate elements corresponding to separate circular Fourier transform spatial components of a Fourier transformed light image that may fall upon the filter element 16.

Optically transparent electrically conductive electrodes, as of tin oxide, are deposited upon opposite faces of the filter element 16 in registration with respective ones of the arcuate active electro-optic elements of the filter 16. Operating voltages are selectively applied across respective ones of the electrodes for applying a corresponding electric field across respective ones of the arcuate electro-optically active elements for changing a light transmission property of the respective element.

In a typical example, the electro-optic elements are made of a material which exhibits the Pockles effect, i.e., in the presence of an applied electric field parallel to the Poynting vector of the incident light, the polarization of the light is rotated. The active elements of the filter 16 have sufficient length and sufficient potential applied thereacross for rotating the plane of polarization of the light image passing therethrough by approximately 90°. The output polarizer 15' serves to polarization analyze the light, and in one embodiment serves to exclude or reject light that has had its polarization changed by the energized electro-optic elements of the filter 16.

A second condensing lens 18 is positioned a focal distance $f_0$ of the lens behind the output face of the Fourier transform filter element 16. An output viewing screen 19 is positioned one focal distance of the condensing lens 18 behind the lens 18 such that the output condensing lens 18 serves to Fourier transform the image in the Fourier transform plane of the filter 16 to a reconstituted image at the viewing screen 19. The reconstituted image at screen 19 is modifiable in accordance with the particular electro-optic elements of the Fourier transform filter 16 that are energized. In the case where the center spot element of the Fourier transform filter 16 is energized, the dc Fourier component of the image is heavily attenuated, thereby substantially increasing the contrast in the image displayed on the output screen 19.

The polarizers 15 and 15' may be located anywhere between the light source and the Fourier transform filter 16 and the output screen 19 and the Fourier transform filter 16, respectively.

For the sake of simplicity of explanation, the Fourier transform electro-optic filter 16 has been depicted and described, thusfar, as only a single Fourier filter element for selectively attenuating the ring-shaped spacial Fourier components of the image. In actuality both ring and radial Fourier components exist. Accordingly, a second electro-optically active mosaic filter element 16 may be located adjacent the first Fourier transform element 16 with an additional polarizer inbetween. The second Fourier transform element would include a plurality of radially directed electro-optically active elements, said elements having overlaying optically transparent radial electrodes conforming to the shape of the underlying electro-optically active members for selectively attenuating the radial Fourier spacial components of the image. In this case, the input face of the composite filter would be spaced one focal distance $f_0$ from the input condensing lens 14 and the output face of the composite Fourier transform filter would be spaced one focal distance $f_0$ from the output condensing lens 18.

Referring now to FIG. 2, there is shown a method for making the ring-type Fourier transform electro-optic filter. More particularly, alternate rings of opaque glass fibers and transparent electro-optically active glass fibers, as shown in FIG. 3, are assembled to form for example a Fourier transform ring filter having an active diameter of 1.00 inch. The center spot 23, in a typical example, has a diameter of 0.048 inch and there are, for example, 19 ring electro-optically active members concentrically disposed of the center spot 23 such active members being formed by the active glass fiber portion and each having a radial width of for example 0.023 inch with the opaque glass fiber rings being employed separating adjacent active glass rings. The opaque glass rings have, for example, a radial thickness of 0.002 inch. The glass assembly of FIG. 2 is, for example, up to 6 inches in length.

Once the bundle of glass fibers has been assembled to the desired array, the bundle of fibers is inserted within an evacuable inactive glass tube 24, as of 0.100 inch wall thickness. The glass assembly is then raised to a relatively high temperature and fused together by drawing a vacuum inside the tube 24 and exerting several atmospheres of pressure on the outside of the tube 24 as by a fluid such as nitrogen gas. In this manner, an inwardly directed pressure is applied uniformly during the glass fusing operation. The resultant glass boule is allowed to cool and sliced transversely into plates. The plates are lapped on opposite sides and polished to proper tolerances to prevent undesired optical reflection and diffusion of light from the polished faces.

Suitable electro-optically active glasses for an electro-optically active filter operating on the principle of rotation of the polarization of the light employ glass materials that display the Pockles effect. This phenomenon is similar to the Kerr effect but concerns solids rather than liquids. In the Pockles effect:

$$\vec{S} \times \vec{E} = 0$$

where $\vec{S}$ is the Poynting vector and $\vec{E}$ is the applied electric field vector. Suitable glass like materials that exhibit the Pockles effect would contain network dwelling components which display tendencies toward electric polarization. Network dwellers in glasses which display such properties include, Tl, Pb, Bi, In, Sn, Sb and As. These elements have outer shells which consist of a filled $s$ subshell and a partially filled $p$ subshell. The electrons in the $s$ shell are called an inert pair. They establish an initial electric polarization of the atom when the element combines with the oxygen atom in the glassy state. Variations in the degree of polarization will also affect the magnitude of the index of refraction.

Of the aforecited elements, Pb, Bi and Tl display greater polarization effects than the other elements. This is so since the Pb, Tl, and Bi electric polarization characteristics are determined by the $6s$ and $6p$ subshells while the same characteristics for In, Sn, Sb, and As are determined by the $5s$ and $5p$ subshells. Samples of suitable glasses are type SF 4 or SF 6 available from Schott. These glasses are high in PbO (70%) and are about 30% $SiO_2$. In addition glasses with lower lead content, i.e., approximately 50%, are candidates.

Further, glass formers of the type $GeS_2$ and $GeSe_2$ exhibit high transmission in the infrared region of the spectrum and to these basic chalcogenide networks are added large ions which display a high degree of electric polarizeability. These large ions are preferably of the aforedescribed types and include Pb, Tl and Bi.

Still another altenative includes ferro-electric crystals such as $NaKNbO_3$, $Pb_3Nb_2O_9$, or $KTaO_3$, or $BaTiO_3$ which are dispersed in either the oxide type glass or chalcogenide type glass. By proper heat treatment, uniform crystallization is promoted. By careful control of this process, a transparent glass-ceramic aggregate is formed with ferro-electric crystal dimensions of less than one-half micron. The result is a suitable material which exhibits good optical transmission and electro-optic activity.

Referring now to FIGS. 4 and 5, there is shown the arrangement of the electrodes on the filter plate for applying the electric fields across the individual electro-optically active members. More particularly, an optically transparent coating is deposited over opposite faces of the plate 16. By conventional photoetching techniques, the electrode pattern of concentric rings is etched into the electrically conductive transparent coatings on opposite faces of the plate 16. The coatings are removed or etched away in registration with the annular opaque glass rings such that the remaining optically transparent electrode portions are in axial registration with respective ones of the electro-optically active ring elements. In addition, a radial segment of the electrodes are etched away in a certain pattern of radially directed leads which are flared at their outer perimeter into electrode contact points on the ring of inactive glass 24. Electrical contact is then made to each of the respective ring elements of the filter by means of contact fingers or other conventional contactors engaging the electrode contact points arranged at the outer periphery of the inactive glass border. In a typical example, the circumferential width of the radial arrangement of electrode leads would be approximately 0.030 inch, and the inactive border would have a radial width of approximately 0.100 inch. The electrode contacts are shown in greater detail in FIG. 5.

One of the advantages to the electro-optically active filter structure of FIGS. 2–4 is that each of the electro-optically active elements, i.e., ring segments, is separated from the adjacent ring segment via the opaque glass material which serves to prevent cross talk, i.e., propagation of light between adjacent active members. In other words, light from a transparent active ring member is not scattered into adjacent active ring members to degrade the contrast and resolution characteristics of the filter. In the prior art, it has been proposed to coat the surface of an electro-optically active filter plate with opaque rings for separating adjacent active regions. While such an input surface coating is useful in blocking signals which would otherwise enter the filter through regions between adjacent active regions, the coating is ineffective in preventing cross-talk between the adjacent ring portions.

Referring now to FIGS. 6 and 7, there is shown a method for fabricating the radial or wedge type mosaic electro-optically active filter. More particularly, in this configuration, a plurality of elongated wedge-shape electro-optically active glass members 27 are formed as by extrusion, cutting and polishing, or by laying up individual electro-optically active fibers and fusing same into the wedge shape. The wedge-shape active glass members 27 are then assembled with opaque glass spacers separating adjacent wedge-shaped active glass members. In a typical example, forty wedge-shaped active members 27 are employed around a central axially directed cylindrical member 29 which is surrounded by a cylindrical opaque glass separator 31. The active glass members 27 are made of the aforecited materials and after assembly of the individual members, the assembly is inserted into an inactive glass tube 24 and the assembly is fused at a temperature and pressure as aforedescribed with regard to the embodiments of FIGS. 2 and 3 to form a glass boule. The glass boule, as before, is transversely sliced into plates which are polished and transparent electrodes are formed on opposite faces thereof.

More particularly, referring now to FIGS. 8 and 9 the electrode geometry for the wedge filter is shown. Both faces of each of the filter plates 16' are coated with an optically transparent electrically conductive material, such as tin oxide. The tin oxide coating is then photoetched by conventional methods well known in the transistor art to form an array of wedge-shaped transparent electrodes 32 on opposite faces and in registration with respective ones of the electro-optically wedge-shaped members of the mosaic array. In a typical example, as shown in FIG. 9, the inactive opaque glass separator 28 between each of the electro-optically active members has a width as of 0.002 inch, the electro-optically active wedge members and their corresponding overlaying electrodes have a radial extent of 0.475 inch, a circumferential thickness at their outer edges of 0.156 inch. The electrodes include contact points extending over into the inactive border 24 for making electrical contact to the respective electrodes.

Referring now to FIGS. 10–12, there is shown an alternative embodiment of the present invention. It is found that variations in the degree of polarization of the electro-optically active glass will affect the magnitude of the index of refraction for that glass. Accordingly, the electro-optically active glasses exhibit electro-optically induced variation in the index of refraction for the member. Thus, in an alternative embodiment, as shown in FIG. 10, the glass boule from which the individual plates are sliced is made up of a multitude of glass fibers each glass fiber including an electro-optically active core member 34 clad by a surrounding glass border 35. The individual clad fibers operate as light pipes or optical waveguides in the transparent mode. However, the indices of refraction $n_1$ and $n_2$ for the core glass 34 and cladding glass 35, respectively, are chosen such that in the transparent mode of operation as indicated in FIG. 12 the index of refraction for the cladding glass layer 35 is less than the index of refraction for the core glass such that optical waves are reflected from the boundary between the two glasses back into the light pipe. However, for the opaque mode, the cladding glass has an index of refraction $n_2$ greater than the index of refraction for the core glass $n_1$, as shown in FIG. 11. In such a case the light rays incident at the boundaries and originating within the core glass 35 have a greater tendency to be refracted into the cladding glass of layer 35, thereby preventing transmission of light through the respective electro-optically active member 34 or waveguide. The filter plate 16' is made up of a multitude of such closely packed clad electro-optically active fibers and the aforecited electrode geometries (both ring and wedge) are formed on opposite sides of the plate for electronically controlling the transmission of light to the composite filter element 16. In a preferred embodiment an opaque glass material is formed in between adjacent clad fibers to form a conventional extra mural absorber structure in the composite fiber optic structure. The advantage to this construction is that the polarizers can be eliminated.

Depending upon the degree of polarization of the electro-optically active elements of the filter, the applied voltage can vary between 1,000 volts and a few volts. In the case where the polarization of the electro-optically active element is relatively high and therefore a relatively low applied voltage can be utilized, the two arrays of electrodes, namely the ring array of FIG. 4 and the wedge or radial array of FIG. 8 can be superimposed upon each other in insulative relation by depositing an optically transparent insulator between the superimposed electrode arrays.

As used herein "optical" and "light" include light waves in the visible as well as in the invisible range of wavelengths and include the infrared wavelengths as well.

What is claimed is:

1. In a light valve, a solid plate comprising a fused glass assemblage, said plate having two opposed faces, a mosaic of transparent electro-optically active regions interconnecting said opposed faces, and an optically opaque material separating adjacent ones of said active regions; and a plurality of optically transparent electrodes overlaying said opposed faces of said solid plate, said electrodes being formed in patterns for selectively applying an electric field across respective electro-optically active regions of said plate for electrically controlling an optical transmisson property of said respective regions.

2. The apparatus of claim 1 wherein said electro-optically active regions are made of a material in which the plane of polarization of the light transmitted therethrough is rotated in response to application of the electric field across respective active regions of said mosaic structure.

3. The apparatus of claim 2 wherein said electro-optically active members are made of a glass material containing electric polarization constituents selected from the group consisting of Tl, Pb, Bi, In, Sn, Sb, As, $NaKNbO_3$, $Pb_3Nb_2O_9$, $KTaO_3$, $BaTiO_3$ and PbO.

4. The apparatus of claim 3 wherein said glass material is selected from the group consisting of $GeS_2$ and $GeSe_2$.

5. The apparatus of claim 1 wherein said patterns of transparent electrodes include an overlaying array of radially spaced circumferentially directed concentric transparent electrodes.

6. The apparatus of claim 1 wherein said patterns of transparent electrodes include an overlaying array of circumferentially spaced radially directed transparent electrodes.

7. The apparatus of claim 1 wherein respective ones of said electro-optically active regions are surrounded by a cladding material and wherein said electro-optically active regions are made of a material in which the index of refraction changes in response to an electric field applied across the respective mosaic member, and wherein the electro-optically active regions have an optical transmission mode with an index of refraction greater than the index of refraction of said cladding material surrounding respective active regions thereby forming light pipes, and further have an optically attenuative mode with an index of refraction less than that of said cladding material surrounding respective active region.

8. The apparatus of claim 2 including, means for polarizing the light incident on said mosaic, and means for polarization analysis of the light passing through said mosaic.

* * * * *